(12) United States Patent
Lo (10) Patent No.: US 9,051,020 B2
(45) Date of Patent: Jun. 9, 2015

(54) FRAME OF BICYCLE

(71) Applicant: Chiu-Hsiang Lo, Taichung (TW)

(72) Inventor: Chiu-Hsiang Lo, Taichung (TW)

(*) Notice: Subject to any disclaimer, the term of this patent is extended or adjusted under 35 U.S.C. 154(b) by 245 days.

(21) Appl. No.: 13/658,833

(22) Filed: Oct. 24, 2012

(65) Prior Publication Data
US 2014/0042725 A1 Feb. 13, 2014

(30) Foreign Application Priority Data
Aug. 9, 2012 (TW) .............................. 101215359 U (51) Int. Cl.
| | | |
|---|---|---|
| B62J 1/08 | (2006.01) | |
| B62K 19/00 | (2006.01) | |
| B62K 19/36 | (2006.01) | |
| B62K 3/06 | (2006.01) | |
| B62K 19/02 | (2006.01) | |

(52) U.S. Cl.
CPC ... *B62K 3/06* (2013.01); *B62J 1/08* (2013.01); *B62K 19/02* (2013.01); *B62K 19/36* (2013.01)

(58) Field of Classification Search
CPC ................. B62J 1/00; B62J 1/04; B62J 1/06; B62J 1/08; B62J 3/02; B62J 15/00; B62J 19/30; B62J 19/36
USPC ............... 180/220; 280/274, 275, 278, 281.1, 280/282, 283, 287, 288.4; 297/195.1, 297/195.13, 215.13, 215.14, 215.15; 482/57
See application file for complete search history.

(56) References Cited

U.S. PATENT DOCUMENTS

| | | | | |
|---|---|---|---|---|
| 4,772,069 | A * | 9/1988 | Szymski .................. 297/215.14 |
| 4,919,378 | A * | 4/1990 | Iwasaki et al. ........... 248/295.11 |
| 5,007,675 | A * | 4/1991 | Musto et al. ............. 297/215.14 |
| 5,149,034 | A * | 9/1992 | Ganaja ........................ 248/178.1 |
| 5,308,030 | A * | 5/1994 | Bales ............................. 248/214 |
| 5,513,895 | A * | 5/1996 | Olson et al. ............. 297/215.14 |
| 6,016,882 | A * | 1/2000 | Ishikawa .................... 180/207.3 |
| 6,729,692 | B1 * | 5/2004 | Chou ......................... 297/463.1 |
| 6,752,453 | B1 * | 6/2004 | Yapp ........................ 297/215.14 |
| 6,811,174 | B2 * | 11/2004 | Luetkemueller et al. ..... 280/274 |
| 7,393,125 | B1 * | 7/2008 | Lai ................................ 362/473 |
| 8,052,581 | B1 * | 11/2011 | Lohr et al. ....................... 482/63 |
| 2002/0151414 | A1 * | 10/2002 | Baker ............................. 482/57 |
| 2005/0285368 | A1 * | 12/2005 | Yifrah et al. .................. 280/287 |
| 2010/0187873 | A1 * | 7/2010 | Geyer et al. ............. 297/215.13 |
| 2010/0194156 | A1 * | 8/2010 | Kim ......................... 297/215.15 |
| 2010/0258701 | A1 * | 10/2010 | Foreman ....................... 248/408 |
| 2011/0057413 | A1 * | 3/2011 | Lee .............................. 280/278 |
| 2012/0049483 | A1 * | 3/2012 | Dodman et al. ........... 280/281.1 |
| 2012/0104811 | A1 * | 5/2012 | Hsieh ....................... 297/215.13 |
| 2012/0161480 | A1 * | 6/2012 | Lu et al. ................... 297/215.14 |
| 2013/0292920 | A1 * | 11/2013 | Alan ............................. 280/274 |

\* cited by examiner

*Primary Examiner* — Joseph Rocca
*Assistant Examiner* — Marc A Scharich (57) ABSTRACT

A bicycle frame includes a seat tube, two chain stays and a down tube connected to the seat tube. A seat post is inserted into the seat tube and has a seat connected thereto. The chain stays is connected to a rear wheel and a head tube is connected to the down tube. A front fork is connected to the head tube. A tubular body is connected to the bicycle frame and the wall of the tubular body has a first slot. The seat tube is connected to a slide which is connected to the wall of the tubular body. A pin extends through the slide and the first slot. A first securing member and a second securing member are connected to two ends of the pin. The first and second securing members connect the wall of the tubular body to the slide.

9 Claims, 12 Drawing Sheets

FRAME OF BICYCLE

FIELD OF THE INVENTION

The present invention relates to a bicycle frame, and more particularly, to a bicycle frame capable of adjusting height of the seat.

BACKGROUND OF THE INVENTION

The conventional bicycles can be powered by the rider manually or electric power, and the two types of bicycles each have a frame, a seat, a handle, a front wheel and a rear wheel. The seat, the handle, the front wheel and the rear wheel are installed to the frame by the seat tube, the head tube, the front fork and the rear fork. For the electric bicycle, the electric unit and battery are further installed to the frame to provide electric power to the electric bicycle. Different frames are developed for different purposes.

The known bicycle frames does not have satisfied mechanism for adjusting the height and positions of the seat. Generally, the seat is adjusted by adjusting the seat post. The U.S. Pat. No. 7,393,125 discloses a bicycle frame which has an incline seat tube and the seat post is connected to the seat tube. The seat can only be adjusted its height, but the seat cannot be adjust the distance between the seat and the handle. Besides, the battery is carried by a carry box which is connected to the triangular space between the seat tube, the seat tube and the down tube as disclosed in U.S. Pat. No. 7,393,125. U.S. Pat. No. 6,016,882 discloses a box on one side of the frame so as to carry the battery.

The present invention intends to provide a bicycle frame for quickly installing/removing the battery to/from the bicycle frame, and the material required to the carry the battery is saved.

SUMMARY OF THE INVENTION

The present invention relates to a bicycle frame and comprises a seat tube, two chain stays and a down tube connected to the seat tube. A seat post is inserted into the seat tube and has a seat connected thereto. The chain stays is connected to a rear wheel and a head tube is connected to the down tube. A front fork is connected to the head tube. A tubular body is connected to the bicycle frame and the wall of the tubular body has a first slot. The seat tube is connected to a slide which is connected to the wall of the tubular body. A pin extends through the slide and the first slot. A first securing member and a second securing member are connected to two ends of the pin. The first and second securing members connect the wall of the tubular body to the slide.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 8 and 11, the bicycle frame 1 of the present invention comprises a seat tube 30, two chain stays 20 and a down tube 10 connected to the chain stays 20. A seat post 40 is inserted into the seat tube 30 and has a seat 45 connected thereto. The chain stays 20 are connected to a rear wheel 21. A head tube 11 is connected to the down tube 10 and a front fork 12 is connected to the head tube 11. A front wheel 13 is connected to the front fork 12. The chain stays 20 comprise a main tube 201 and two extension tubes 202. A through hole 203 is defined transversely through the mediate portion of the main tube 201 and a crank extends through the through hole 203. The rear wheel 21 is pivotably connected to the two extension tubes 202.

Figure 1:
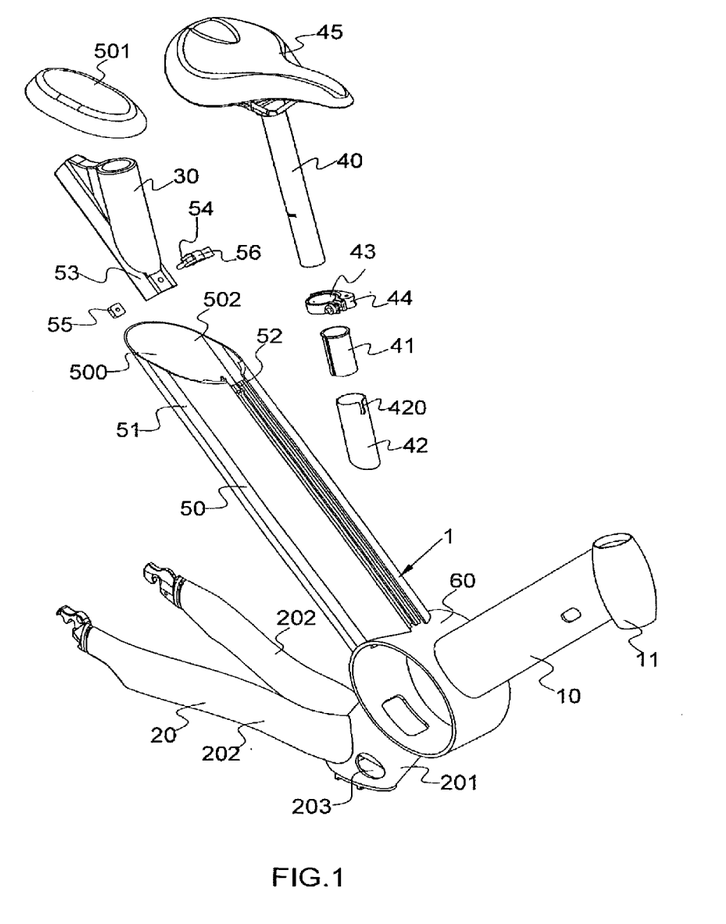
FIG. 1 is an exploded view to show the bicycle frame of the present invention.
Figure 2:
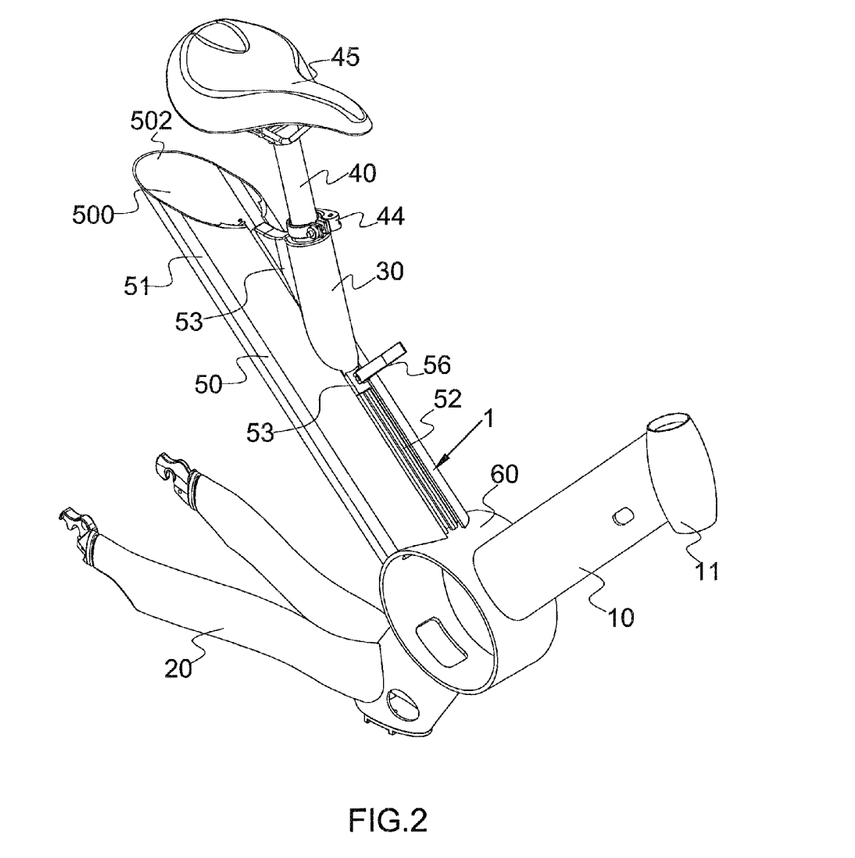
FIG. 2 is a perspective view to show that the slide is located at the first position.
Figure 3:
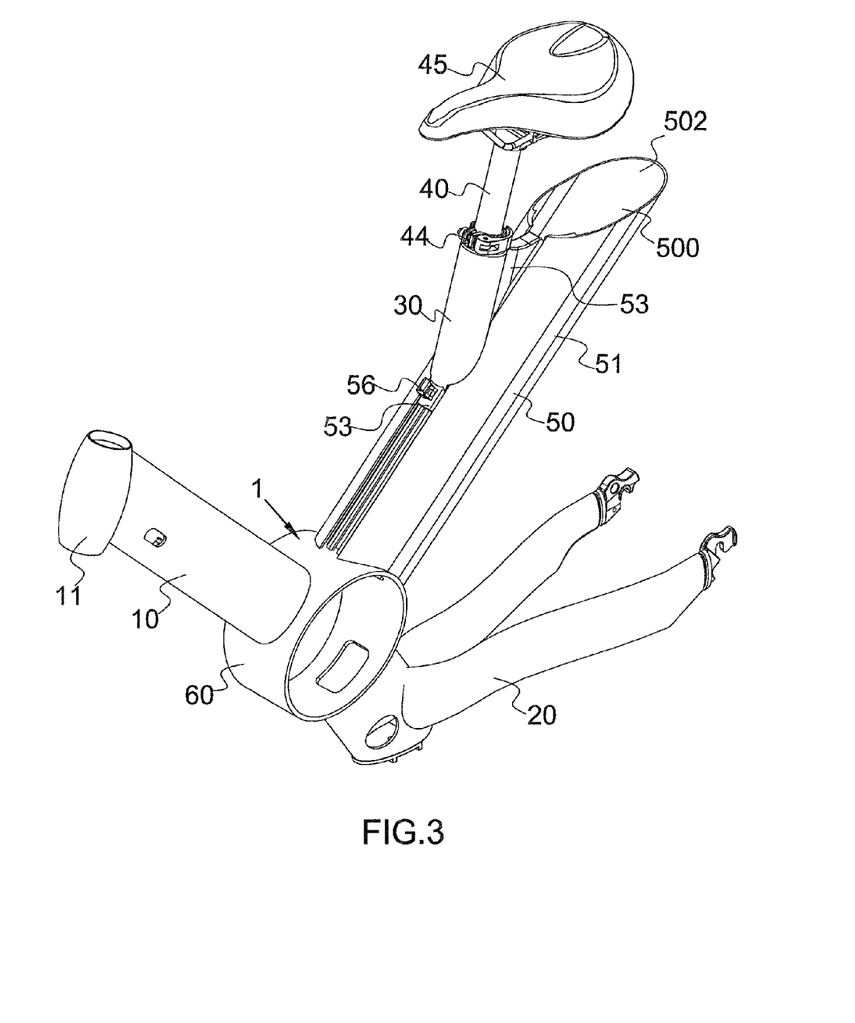
FIG. 3 is another perspective view to show that the slide is located at the first position.
Figure 4:
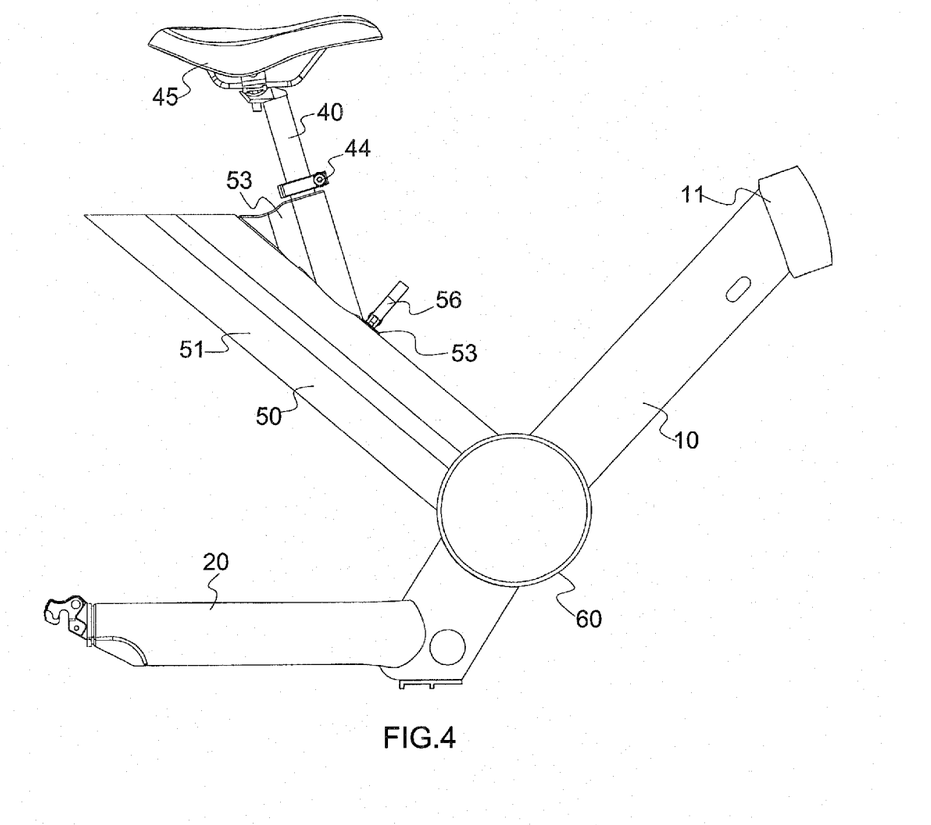
FIG. 4 is a side view to show that the slide is located at the first position.
Figure 5:
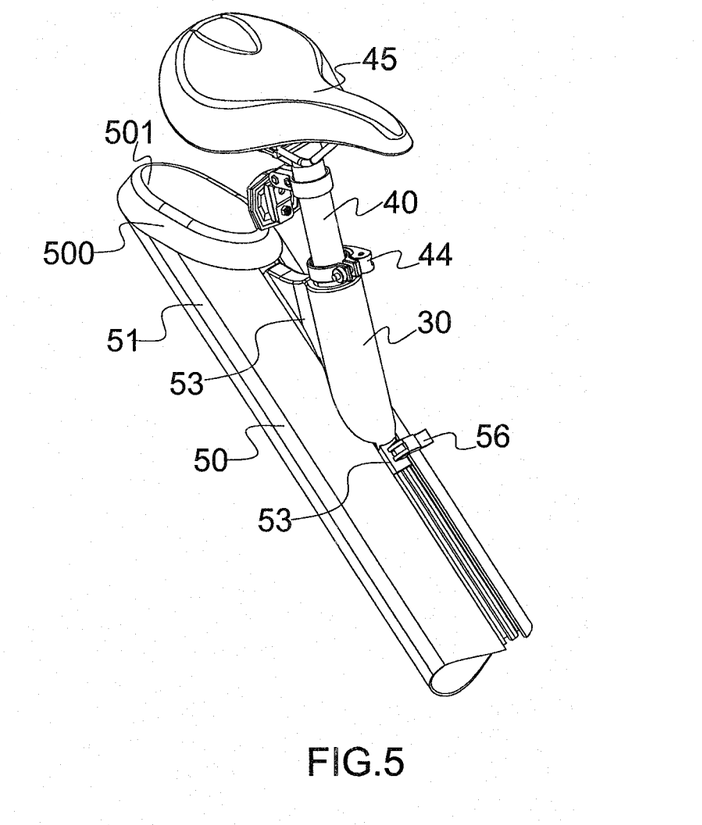
FIG. 5 is yet another perspective view to show that the slide is located at the first position.
Figure 6:
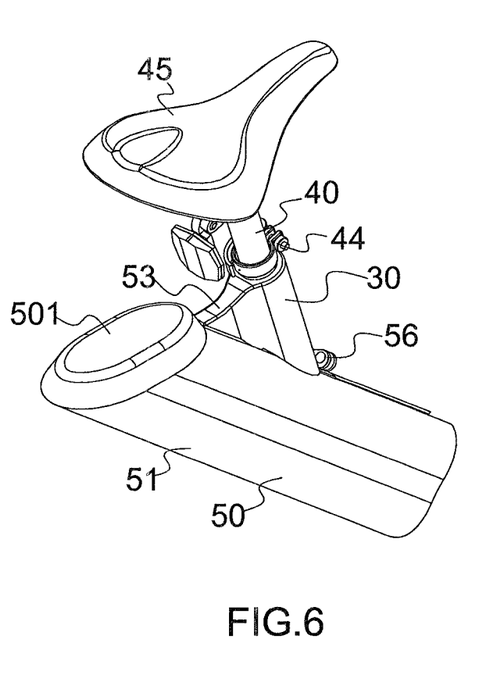
FIG. 6 is yet another perspective view to show that the slide is located at the first position.
Figure 7:
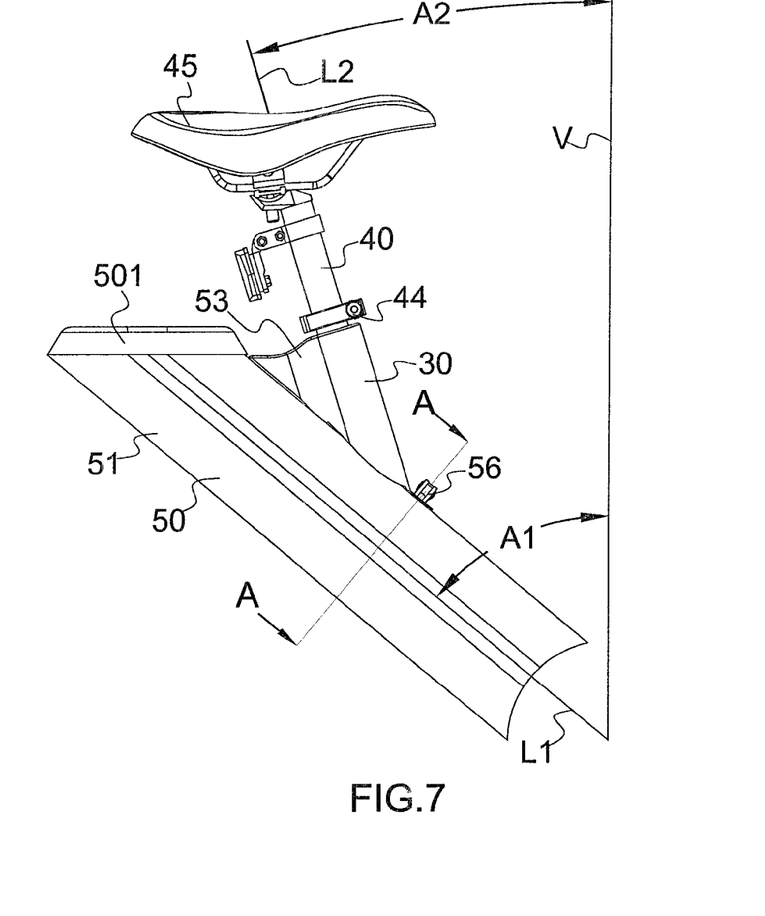
FIG. 7 is a side view to show that the slide is located at the first position.
Figure 12:
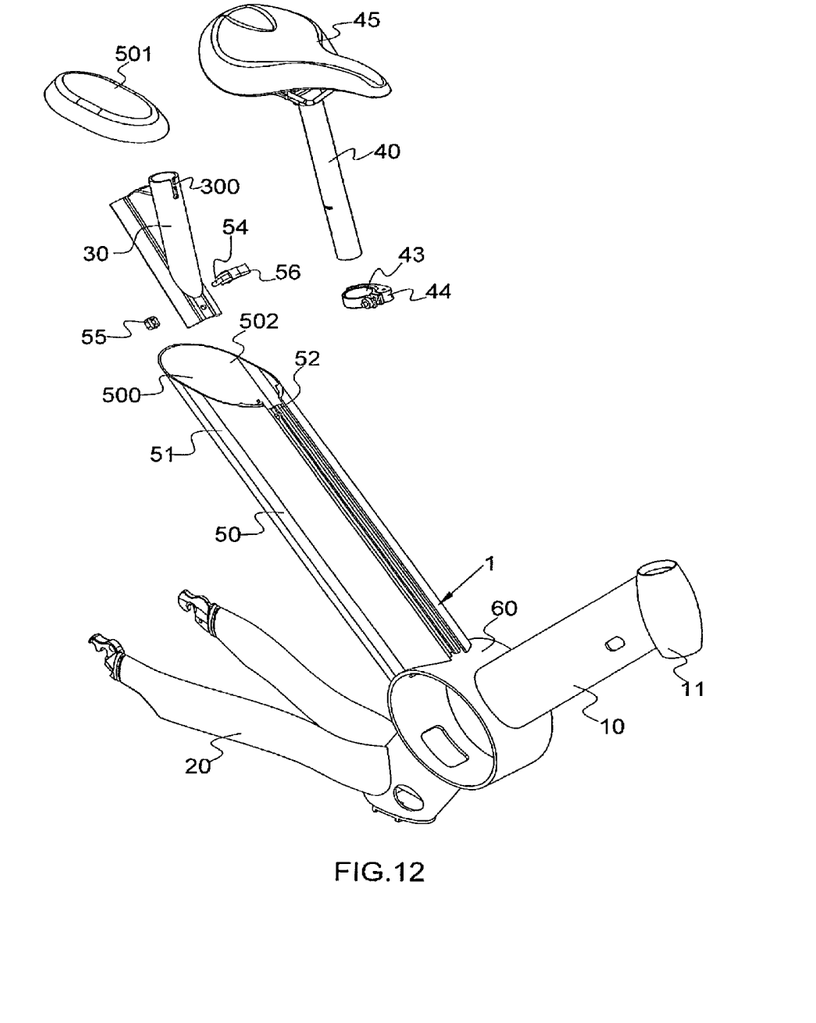
FIG. 12 shows another embodiment of the connection between the seat tube and the seat post.

As shown in FIG. 1 which shows one way of connection between the seat tube 30 and the seat post 40. An inner tube 41 and an outer tube 42 are located in the seat tube 30, wherein the outer tube 42 is securely matched with the seat tube 30 and the inner tube 41 is has a C-shaped cross section. The outer tube 42 has a notch 420. The seat post 40 extends through the inner tube 41 and a C-shaped clip 43 is mounted to the outside of the outer tube 42. The clip 43 is cooperated with a quick-release device 44 to securely mount the clip 43 to the outer tube 42 at the notch 420. The outer tube 42 secures the inner tube 41 which is securely connect the seat post 40 to the seat tube 30. As shown in FIG. 12, the other way for connecting the seat tube 30 to the seat post 40 is that the seat tube 30 has a slot 300 and the seat post 40 extends through the seat tube 30. The C-shaped clip 43 is mounted to the outside of the seat tube 30. The clip 43 is cooperated with a quick-release device 44 to securely mount the clip 43 to the seat tube 30 at the slot 300. The seat tube 30 is then securely connected with the seat post 40.

As shown in FIGS. 1 to 8 and 11, a tubular body 50 is connected to the bicycle frame 1 and an angle A1 is defined between the axis "L1" of the tubular body 50 and a vertical line "V", and the angle A1 is larger than 45 degrees. Another angle A2 is defined between the axis "L2" of the seat tube 30 and the vertical line "V", and the angle A2 is smaller than 20 degrees. The lower end of the tubular body 50, the front end of the main tube 201 and the rear end of the down tube 10 are connected to a cylindrical part 60. The ratio between the inner diameter of the cylindrical part 60 and the maximum inner diameter of the through hole 203 is at least 2.5. A wall of the tubular body 50 has a first slot 52 which communicates with two ends of the tubular body 50. The tubular body 50 has an opening 500 defined in the top thereof and one end of the first slot 52 extends to communicate with the opening 500. A cover 501 is mounted to the opening 500. The seat tube 30 is connected to a slide 53 which is connected to the wall 51 of the tubular body 50. A pin 54 extends through the slide 53 and the first slot 52. A first securing member 55 and a second securing member 56 are connected to two ends of the pin 54. The first and second securing members 55, 56 connect the wall 51 of the tubular body 50 to the slide 53 so as to combine the slide 53 and the tubular body 50. A room 502 is defined in the tubular body 50 for receiving at least one battery so as to provide electric power to the electric bicycle.

Figure 8:
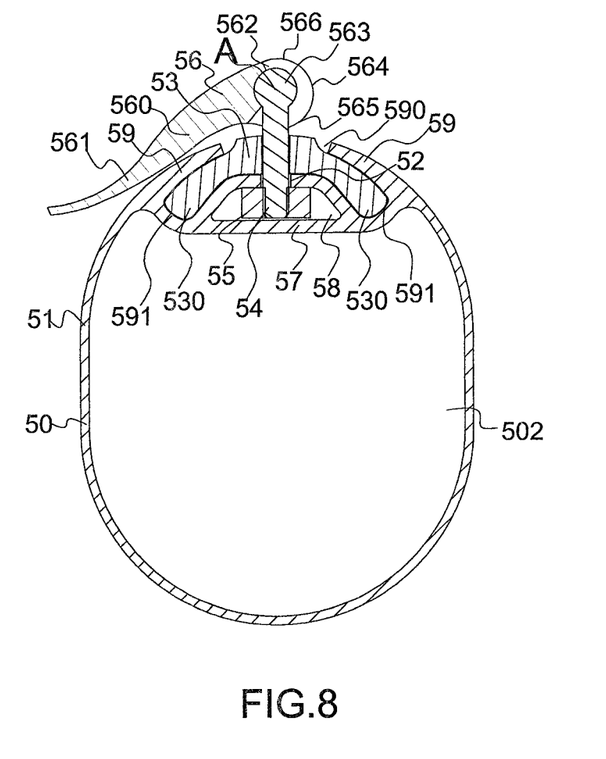
FIG. 8 is a cross sectional view taken along the line A-A in FIG. 7.
Figure 9:
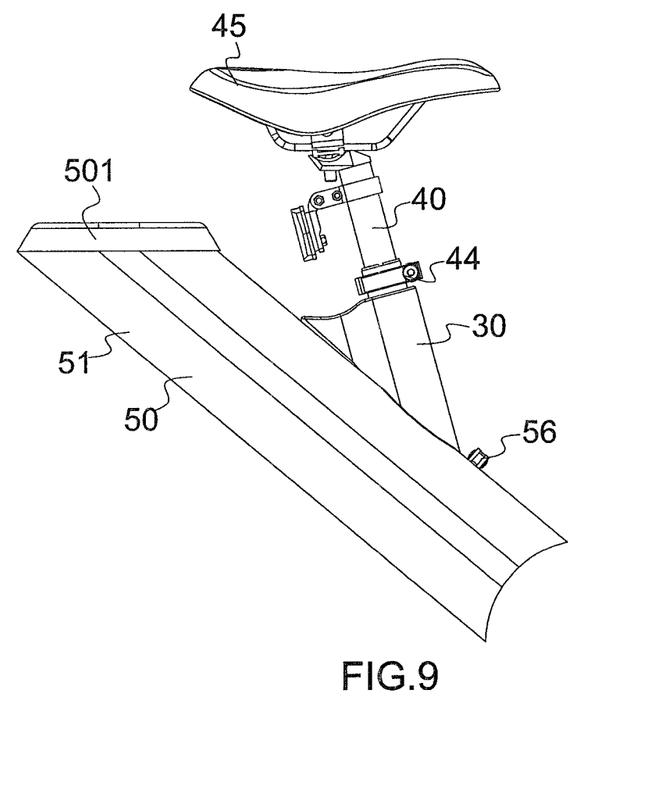
FIG. 9 is a side view to show that the slide is located at the second position.
Figure 10:
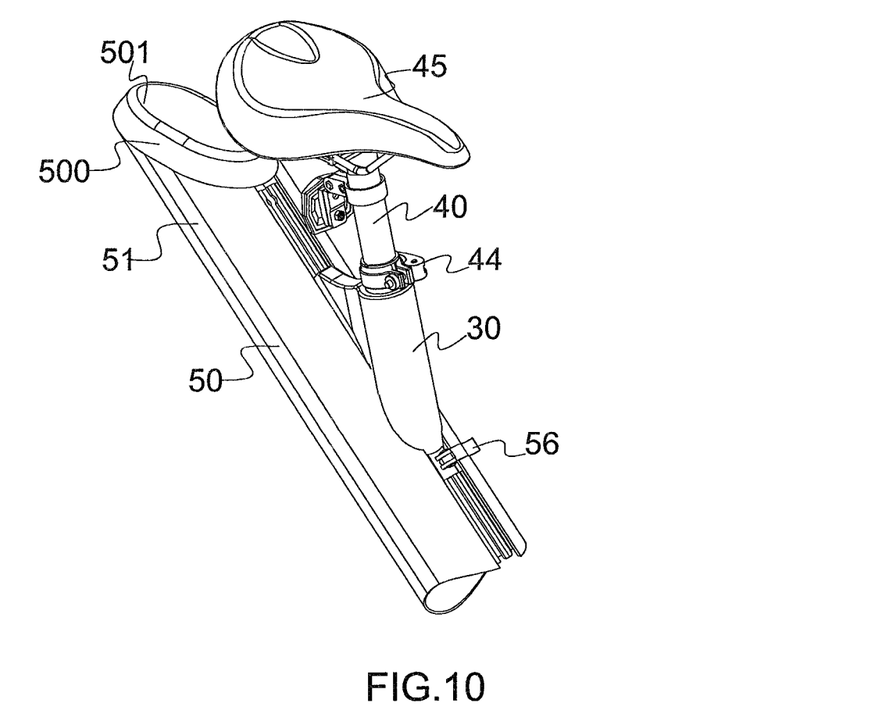
FIG. 10 is a perspective view to show that the slide is located at the second position.
Figure 11:
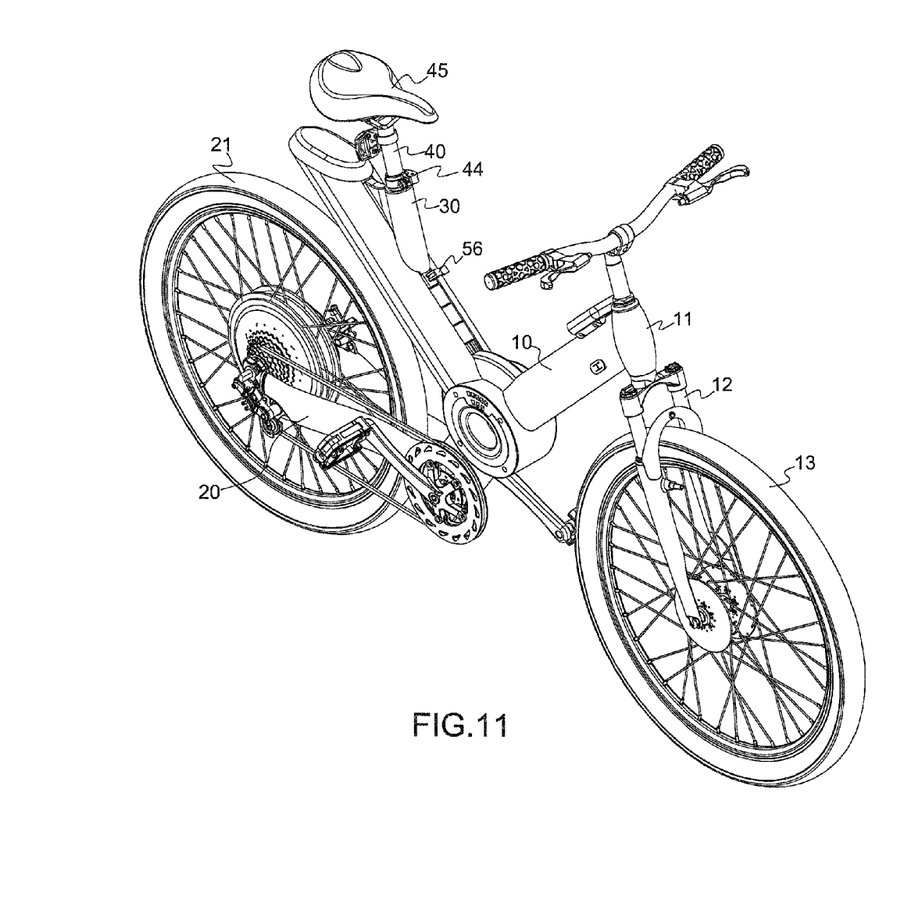
FIG. 11 shows the bicycle with the bicycle frame of the present invention.

As shown in FIG. 8, two covering portions 59 extend from the wall 51 of the tubular body 50 and are located on two sides of the first slot 52. Two respective distal ends of the two covering portions 59 extend toward each other so as to define a second slot 590 therebetween. Two respective engaging spaces 591 are defined between the two covering portions 59 and the wall 51 of the tubular body 50. The slide 53 has two wings 530 which are engaged with the engaging spaces 591.

The second securing member 56 has a lever 560 which has an operation portion 561 at the first end thereof, and a pivotal portion 562 is located at the second end of the lever 560. The pivotal portion 562 is pivotably connected to the pin 54 by a pivot 563. The pivotal portion 562 has a cam portion 564 which is located off from the center "A" and includes a high portion 565 and a low portion 566. When the lever 560 is pivoted about the pivot 563 to a first position to contact the high portion 565 against the slide 53, the first and second securing members 55, 56 securely connect the tubular body 50 and the slide 53. The slide 53 and the seat 45 are secured as shown in FIGS. 5 and 7, or FIGS. 9 and 10. When the lever 560 is pivoted about the pivot 563 to a second position to contact the low portion 566 against the slide 53, the first and second securing members 55, 56 release the tubular body 50 and the slide 53. The slide 53 and the seat 45 are then moved relative to the tubular body 50 so as to adjust the position of the seat 45 relative to the tubular body 50.

The seat 45 can be effectively adjusted by the cooperation of the tubular body 50 and the slide. The tubular body 50 is integral to the frame 1 and receives the battery therein. When the slide 53 is moved relative to the tubular body 50, the top of the tubular body 50 is opened to allow the users to install the battery into the tubular body 50. A separation plate 57 is transversely located in the tubular body 50 and located corresponding to the first slot 52. A recess 58 is defined between the separation plate 57 and the first slot 52, the first securing member 55 is located in the recess 58. Besides, the two covering plates 59 define the engaging space 591, and the two wings 530 of the slide 53 are engaged with the engaging space 531. The structural strength of the frame 1 is reinforced. The quick-release device 44 controls the connection between the slide 53 and the tubular body 50 so that the adjustment to the seat 45 is quick and convenient.

While we have shown and described the embodiment in accordance with the present invention, it should be clear to those skilled in the art that further embodiments may be made without departing from the scope of the present invention.

What is claimed is:

1. A bicycle frame comprising:
a seat tube, two chain stays and a down tube connected to the chain stays, a seat post inserted into the seat tube and having a seat connected thereto, the chain stays connected to a rear wheel, a head tube connected to the down tube, a tubular body connected to the bicycle frame and a wall of the tubular body having a first slot, the seat tube connected to a slide which is connected to the wall of the tubular body, a pin extending through the slide and the first slot, a first securing member and a second securing member respectively connected to opposite ends of the pin, and the first and second securing members connect the wall of the tubular body to the slide.

2. The bicycle frame as claimed in claim 1, wherein the bicycle frame is an electric bicycle frame, a room is defined in the tubular body for receiving at least one battery.

3. The bicycle frame as claimed in claim 1, wherein the tubular body has an opening defined in a top thereof, one end of the first slot extends to communicate with the opening.

4. The bicycle frame as claimed in claim 3, wherein a cover is mounted to the opening.

5. The bicycle frame as claimed in claim 1, wherein a separation plate is transversely located in the tubular body and located corresponding to the first slot, a recess is defined between the separation plate and the first slot, the first securing member is located in the recess.

6. The bicycle frame as claimed in claim 1, wherein two covering portions extend from the wall of the tubular body and are located on two sides of the first slot, two respective distal ends of the two covering portions extend toward each other so as to define a second slot therebetween, two respective engaging spaces are defined between the two covering portions and the wall of the tubular body, the slide has two wings which are engaged with the engaging spaces.

7. The bicycle frame as claimed in claim 1, wherein the second securing member has a lever which has an operation portion at a first end thereof, a pivotal portion is located at a second end of the lever, the pivotal portion is pivotably connected to the pin by a pivot, the pivotal portion has a cam portion which includes a high portion and a low portion, wherein when the lever is pivoted about the pivot to a first position to contact the high portion against the slide, the first and second securing members securely connect the tubular body and the slide, and wherein when the lever is pivoted about the pivot to a second position to contact the low portion against the slide, the first and second securing members release the tubular body and the slide.

8. The bicycle frame as claimed in claim 1, wherein the chain stays comprise a main tube and two extension tubes, a through hole is defined transversely through a mediate portion of the main tube and a crank extends through the through hole, the rear wheel is pivotably connected to the two extension tubes, a lower end of the tubular body, a front end of the main tube and a rear end of the down tube are connected to a cylindrical part.

9. The bicycle frame as claimed in claim 8, wherein a ratio between an inner diameter of the cylindrical part and a maximum inner diameter of the through hole is at least 2.5.

* * * * *